United States Patent
Vuoristo et al.

(10) Patent No.: US 6,603,969 B1
(45) Date of Patent: Aug. 5, 2003

(54) SUBSCRIBER SERVICE PROFILES IN TELECOMMUNICATION SYSTEM

(75) Inventors: Sirpa Vuoristo, Vantaa (FI); Seija Salmela, Masala (FI); Markku Tuohino, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/554,855

(22) PCT Filed: Nov. 25, 1998

(86) PCT No.: PCT/FI98/00926
§ 371 (c)(1),
(2), (4) Date: May 22, 2000

(87) PCT Pub. No.: WO99/27722
PCT Pub. Date: Jun. 3, 1999

(30) Foreign Application Priority Data

Nov. 26, 1997 (FI) .................................................. 974338

(51) Int. Cl.⁷ ............................................... H04Q 7/00
(52) U.S. Cl. ................... 455/433; 455/414; 455/435
(58) Field of Search ............... 455/433, 414, 455/432, 435, 415, 416, 466

(56) References Cited

U.S. PATENT DOCUMENTS

| | | | |
|---|---|---|---|
| 5,915,220 A | * 6/1999 | Chelliah | 455/414 |
| 6,108,540 A | * 8/2000 | Sonti et al. | 455/414 |
| 6,208,870 B1 | * 3/2001 | Lorello et al. | 455/412 |
| 6,223,038 B1 | * 4/2001 | Iseyama et al. | 455/433 |
| 6,263,212 B1 | * 7/2001 | Ross et al. | 370/428 |

FOREIGN PATENT DOCUMENTS

| | | | |
|---|---|---|---|
| GB | 2284519 | * | 11/1994 |
| GB | 2 284 519 | | 6/1995 |
| WO | WO 9421075 | * | 9/1994 |
| WO | WO94/21075 | | 9/1994 |
| WO | WO 9628945 | * | 9/1996 |
| WO | WO96/28945 | | 9/1996 |

* cited by examiner

Primary Examiner—Thanh Cong Le
Assistant Examiner—Tan Trinh
(74) Attorney, Agent, or Firm—Pillsbury Winthrop LLP

(57) ABSTRACT

The invention relates to a telecommunication system comprising subscribers, a subscriber network, terminals for connecting the subscribers with the subscriber network and a set of services comprising network-specific services and supplementary services provided by the network and supplementary services transmitted by the network. In order to provide the subscriber with subscriber-specific service profiles differing from one another, the system further comprises memory means (SPR) including at least for one network subscriber not less than two different subscriber-specific (51) service profiles (52) comprising services defined for the subscriber from the set of services. The invention further relates to a mobile station and a subscriber register which can be utilized in the telecommunication system. The invention also relates to a method that can be applied to the telecommunication system.

12 Claims, 4 Drawing Sheets

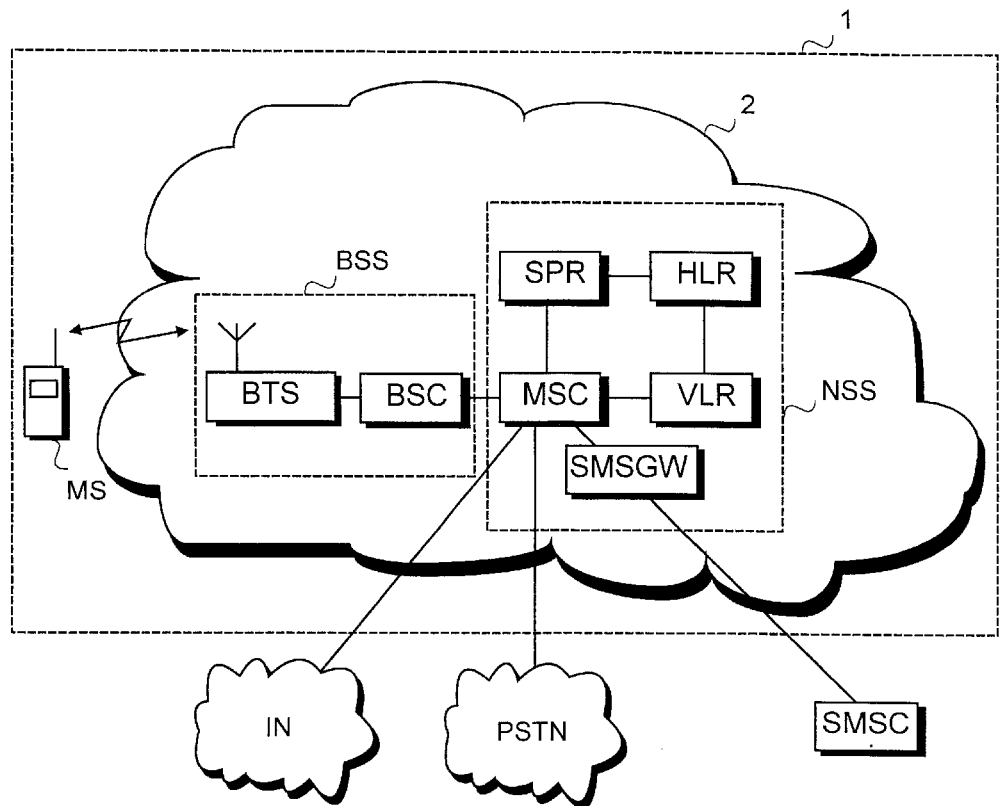
FIG.1
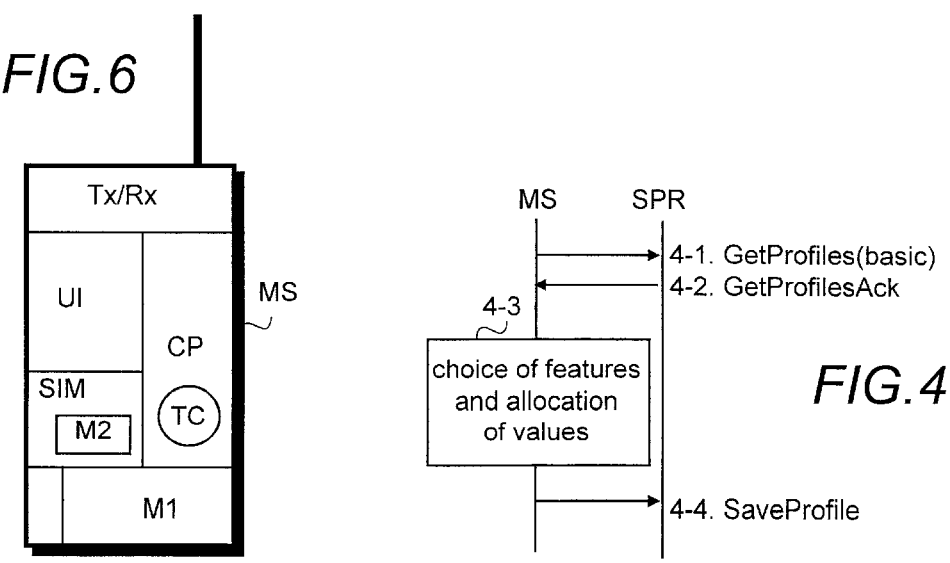
FIG.6
FIG.4

| FEATURE | VALUE 4A | VALUE 4B | VALUE 4C | VALUE 4D |
|---|---|---|---|---|
| profile identifier | work reachable | work engaged | leisure time | holiday |
| profile state | in use | not in use | not in use | not in use |
| mobile station menu | menu1 | menu2 | menu3 | menu3 |
| call forwarding | | | | |
| - forward all | - | MSISDN2 | option | option |
| - phone busy | answering unit 1 | - | answering unit 2 | answering unit 2 |
| - no answer | answering unit 1 | - | answering unit 3 | answering unit 3 |
| - not reachable | ISDN1 | - | answering unit 3 | answering unit 3 |
| barring | - | all | entertainment line | entertainment line |
| conventional short message | SMSC1 | SMSC1 | SMSC2 | SMSC2 |
| e-mail | in use | - | - | - |
| fax | in use | - | - | - |
| personal number | - | - | routing instruction2 | - |
| when will I return SM | routing instruction1 | MSISDN2 | - | MSISDN2 |
| ringing tone | conventional | soundless | conventional | conventional |

FIG.2

SUBSCRIBER SERVICE PROFILES IN TELECOMMUNICATION SYSTEM

This application is the national phase of international application PCT/FI98/00926 filed Nov. 25, 1998 which designated the U.S.

BACKGROUND OF THE INVENTION

The invention relates to subscriber service profiles in a telecommunication network, by which service profiles different service combinations, possibly also comprising subscriber terminal settings, are defined for a subscriber. The invention particularly relates to subscriber service profiles in a mobile network, but can also be utilized in other telecommunication networks.

The development of technology has made it possible to offer different services via a telecommunication network, such as a wired network or a mobile telephone network. In addition to basic services and supplementary services specific for the network, the network subscriber has access to the supplementary services transmitted by the network. Below the basic services and the supplementary services specific for the network will be referred to as the network-specific services and the supplementary services transmitted by the network will be referred to as the supplementary services. The supplementary services are, for example, services offered via an Intelligent Network (IN), such as a Personal Number in which the intelligent network reroutes the calls made to a personal number in the way instructed by the subscriber. Services delivered in text mode via short messages are also offered to mobile network subscribers. In addition to conventional mobile originating and mobile terminating short messages, a subscriber can receive, for example, notices, advertisements, personal reminders and even information via Internet through what is known as Smart Messaging.

Simultaneously as the supply of services increases the mobile communication systems and particularly their terminals develop in such a manner that people can freely move away from fixed terminals without that it becomes more difficult to reach them. However, telecommuting, which allows people to stay at home and to work utilizing a home terminal, has become increasingly popular. Wired network or mobile telephone network terminals are therefore being increasingly used for various purposes and in different situations.

The versatility of the services offered and the use of the same terminal for work and for pleasure have created a need to classify the available services according to situation, place and/or time. Different services are needed in different situations, and very often people wish to keep business and private telephone bills apart.

In a digital mobile communication system, such as the pan-European mobile communication system GSM (Global System for Mobile Communication), various service profiles can be defined for the subscriber concerning the services specific for the mobile communication system. In the GSM system a SIM (Subscriber Identity Module) card is used for identifying the subscriber, the SIM card being a processor card, or a smart card, placed in the terminal and comprising for example information needed for identifying the subscriber, such as an International Mobile Subscriber Identity IMSI. In the GSM system the subscriber can have for himself/herself two different subscriber profiles associated with a single SIM card, in other words with a single subscriber identity IMSI, both subscriber profiles having their own telephone numbers, or subscriber numbers MSISDN. One of the subjects that is being standardized in Phase 2+ of the GSM system in ETSI (European Telecommunication Standard Institute) is Multiple Subscriber Profiles (MSP). There various profiles formed from the GSM system services defined for the subscriber are connected with the SIM card and the subscriber identity IMSI. When a single numbering scheme is used an unambiguous subscriber number MSISDN is associated with each profile. In a multi-numbering scheme it is possible to give each basic service an unambiguous subscriber number MSISDN in each profile. Whichever numbering scheme is used, each profile has its own identifier by which the subscriber can choose the profile to be used, for example when he/she is making a call. The different subscriber profiles are kept in a home location register HLR, which is a subscriber database. Using the information in the HLR, the MSISDN numbers can be associated with the correct subscriber identity IMSI.

A problem with the arrangement described above is that in addition to the network-specific basic services the service profiles do not include other than network-specific supplementary services. For example, in mobile communication systems neither different short message and intelligent network services nor the settings specific for the mobile station cannot be attached to the service profile. Another problem is that the service profiles and the services they offer are based on separate subscriber numbers. Then the subscriber has to remember which service and/or which service combination each subscriber number uses. This complicates the life of the subscriber particularly when he/she is giving his/her contact information: he/she may have three different subscriber numbers connected with speech services in the work-related profiles.

BRIEF DESCRIPTION OF THE INVENTION

An object of the invention is to develop a system and an equipment that will be used in the system in such a manner that the problems described above can be solved. The objects of the invention are achieved with a telecommunication system comprising subscribers, a subscriber network, terminals for connecting subscribers to the subscriber network, and a set of services comprising services provided by the network and supplementary services transmitted by the network and memory means including for at least one network subscriber not less than two different subscriber-specific service profiles comprising services defined for the subscriber from the set of services, the telecommunication system being characterized by further comprising changing means for changing the service profile being used by the subscriber to another service profile, and update means responsive to the changing means for sending the service settings of the service profile to units comprising information needed for providing the services.

Here subscriber-specific means subscriber-number-specific, or if it is not desired to connect the services with the subscriber number, they can be connected with another subscriber identifier, in which case subscriber-specific means identifier-specific.

The invention also relates to a mobile station which can be used in the telecommunication system of the invention. The mobile station of the invention is characterized by further comprising message composing means for providing an inquiry message for detecting at least one subscriber-specific service profile of the subscriber, the service profile comprising services defined for the subscriber and settings which are defined from the network-specific services, the supplementary services transmitted by the network and the settings specific for the mobile station, the inquiry message indicating the subscriber and the service profiles to be detected; reception means for receiving an acknowledgement message comprising all subscriber service profiles and their contents inquired in the inquiry message; a user interface for displaying each received service profile to the subscriber; changing means for changing a first available service profile to a second service profile, and setting means responsive to the changing means for changing the values of the mobile station settings in accordance with the second service profile.

The invention further relates to a subscriber register which can be utilized in the telecommunication system of the invention. The subscriber register is a part of a telecommunication network and offers the network subscribers a set of services comprising the network-specific services and supplementary services transmitted by the network, and comprises a subscriber-specific service profile list for at least one network subscriber, the list including not less than two different service profiles, the service profiles containing at least a part of the services that are defined for the subscriber from the set of services. The subscriber register of the invention is characterized by further comprising reception means for receiving an inquiry message indicating the subscriber and at least one service profile, message composing means responsive to the reception means for providing an acknowledgement message comprising all subscriber service profiles and their contents indicated in the inquiry message, and transmission means for sending the acknowledgement message.

The invention further relates to a subscriber register which can be utilized in the telecommunication system of the invention. The subscriber register is a part of a telecommunication network and offers the network subscribers a set of services comprising the network-specific services and supplementary services transmitted by the network, and comprises a subscriber-specific service profile list for at least one network subscriber, the list including not less than two different service profiles, the service profiles containing at least a part of the services that are defined for the subscriber from the set of services. The subscriber register of the invention is characterized by further comprising reception means for receiving a profile change message indicating the subscriber and at least one service profile, message composing means responsive to the reception means for providing update messages for service units comprising information needed for providing services, and transmission means for sending the update messages.

The invention also relates to a method which can be applied to the telecommunication system, to the mobile station and to the subscriber register of the invention. The method of the invention is characterized by defining a set of services for each network subscriber, the set of services comprising services defined for the subscriber from the network-specific services and supplementary services and subscriber terminal settings if the terminal can change its settings; forming for at least one subscriber not less than two different service profiles both comprising at least one service from the set of services; storing each formed service profile in a subscriber-specific service profile list; changing a first service profile used by the subscriber to a second service profile; and, in response to the service profile change, updating the subscriber-specific values of the units needed in providing services associated with the subscriber service profile to correspond with the second service profile.

The idea of the invention is that the service information associated with the services the subscriber uses are concentrated in one place. The advantage of the system of the invention is thus that the subscriber is able to use the versatile service profiles comprising all the services defined for him/her by the use of which he/she easily changes e.g. the operation of all services by changing only a piece of information, or a profile. The subscriber does no longer have to remember what services the network offers, or which services do not change when profiles are changed. Another advantage is that the subscriber does not need more than one subscriber number, although he/she may use various service profiles, because subscriber-specific service profiles or the services they contain are not separated from one another on the basis of the subscriber number.

In a preferred embodiment of the invention, when the subscriber has changed his/her service profile, the settings of the service units, such as the service database of the home location register HLR and the Intelligent network of the GSM system comprising the information needed in providing services, are updated to correspond with the changed service profile using normal updating routines. This has the advantage that current network elements can be utilized as before and no changes are needed. Furthermore, updating is used to see to it that all services provided by the network are in accordance with the service profile.

In another preferred embodiment of the invention the service profile is changed at a predetermined point of time. This has the advantage that the subscriber does not have to attend to the profile changes himself/herself, but for example the work profile automatically changes to the home profile in the evening, and in the morning the change is automatically reversed.

In a preferred embodiment of the invention in which the terminal is a mobile station, the service profile changes to another when the mobile station location changes. The advantage of this embodiment too is that the user does not have to attend to the profile changes.

In another preferred embodiment of the invention in which the terminal is a mobile station, the subscriber can form service profiles for himself/herself from the set of services defined for the subscriber via the mobile station. This has the advantage that the subscriber can form tailor-made service profiles for himself/herself, and even as many as he/she desires.

The preferred embodiments of the system, the mobile station and the subscriber register of the invention are disclosed in the attached dependent claims 2, 3, 6–8 and 10.

BRIEF DESCRIPTION OF THE DRAWINGS

The invention will be described in greater detail in connection with the preferred embodiments with reference to the attached drawings, in which FIG. 1 shows the parts of a mobile communication system that are essential to the invention, FIG. 2 shows an example of a mobile station subscriber service profiles, FIG. 4 illustrates signalling according to the first preferred embodiment of the invention in connection with a service profile forming, FIG. 6 is a block diagram showing a mobile station according to the first preferred embodiment of the invention.

DETAILED DESCRIPTION OF THE INVENTION

Figure 3:
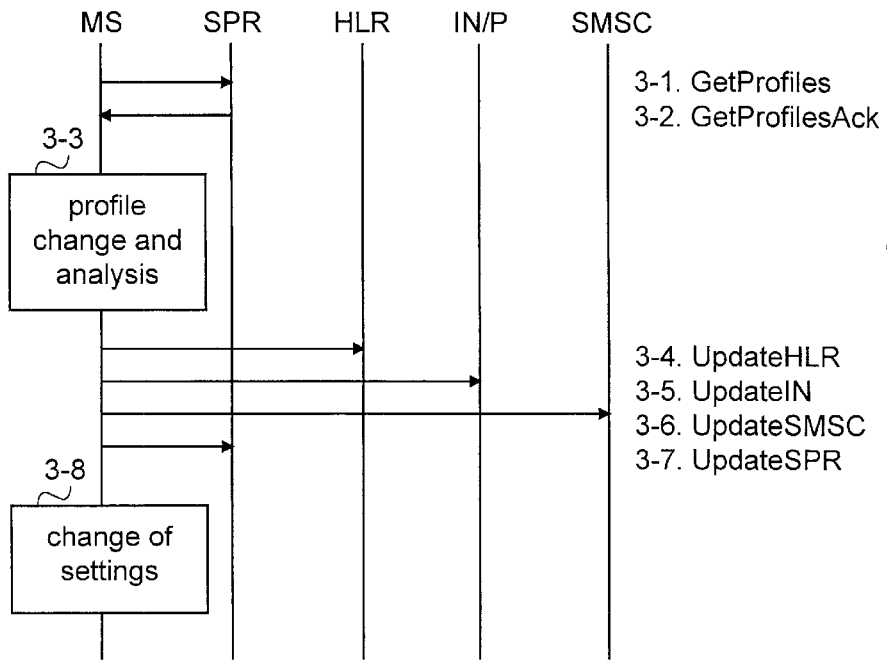
FIG. 3 illustrates signalling according to a first preferred embodiment of the invention in connection with a service profile change.

The present invention is applicable to different types of telecommunication systems in which a subscriber has access to subscriber network-specific services and services transmitted by the subscriber network, such as intelligent network services. In the following, the preferred embodiments of the invention will be described using the GSM system as an example, although not restricting the invention to any particular telecommunication system. It should be noted that a mobile communication network only offers a physical connection and a platform for providing services for a mobile station MS subscriber, and that the precise operation and structure of the mobile communication network are not relevant to the invention.

The basic structure of a GSM system 1 is shown in FIG. 1. The structure of a GSM network 2 comprises two parts: a Base Station Subsystem BSS and a Network Subsystem NSS. The BSS and the mobile stations MS communicate using radio connections. In the base station subsystem BSS each cell is served by a Base Transceiver Station BTS. A set of base transceiver stations BTS are connected to a Base Station Controller BSC, whose function is to control the radio frequencies and radio channels used by the base transceiver station BTS. The base station controllers BSC are connected to a Mobile Switching Centre MSC. The task of the mobile switching centre is to connect calls in which at least one mobile station MS takes part. Some mobile switching centres MSC are linked to other telecommunication networks, such as a Public Switched Telephone Network PSTN, and they comprise functions for connecting calls to and from these networks. Such mobile switching centres are called gateway MSCs. Some mobile switching centres can also be connected to an Intelligent Network IN for transmitting intelligent network services to the subscriber. In this application an intelligent network means both an intelligent network and other service platforms similar to the intelligent network. For short message services, the system 1 comprises Short Message Service Centres SMSC and Short Message Service Gateways SMSGW of the GSM network 2. The SMSGW is a name common to a Gateway Mobile Switching Centre for Short Message Service SMS-GMSC and an Interworking Mobile Switching Centre for Short Message Service SMS-IWMSC. Short messages can be sent to and from a mobile station from different service centres and using various networks in such a way that the short message is delivered via the short message service centre SMSC. In this application the short message service centre SMSC also represents other service centres associated with different service protocols, such as an Unstructured Supplementary Service Data Centre which is being developed and which offers, for example, interactive services or services connected with calls from the network using USSD signalling.

Two types of databases are associated with the routing of the calls. Subscriber information of all network 2 subscribers, including information about those services specific for the network 2 to which the subscriber has access, and about the current location of the subscriber, are permanently or semi-permanently stored in a home location register HLR. Another type of register is a visitor location register VLR. The visitor location register VLR is generally connected to one mobile switching centre MSC, but it can also serve several centres. The visitor location register VLR can be integrated into the mobile switching centre MSC. When the mobile station MS is active (it has registered into the network and is able to start or receive a call), the majority of the subscriber information on the mobile station MS in the home location register HLR is loaded (copied) into the visitor location register VLR of the mobile switching centre MSC in whose area the mobile station MS is.

In the GSM system of the example the user of the mobile station is identified by a subscriber-specific identification unit, a SIM card, comprising for example a subscriber identifier IMSI. Using the information in the home register, the phone number, or the subscriber number MSISDN, can be connected with the subscriber identifier IMSI irrespective of how many subscriber numbers there are.

The service profiles of the invention are stored in the subscriber register, which is called a Service Profile Register SPR in this application. It can also be integrated into the home location register HLR or it can be integrated into another register in the network. An example of the subscriber service profiles is shown in FIG. 2, and the service profile register is described in greater detail in FIG. 7.

FIG. 2 shows an example of the subscriber-specific service profiles of a GSM subscriber. Here subscriber-specific means subscriber-number-specific. If two or more subscriber numbers are defined for the mobile station subscriber identifier, then specific service profile lists can be defined for each subscriber number: for example, in FIG. 2 the profiles work_reachable and work_engaged could be defined for subscriber number 1 and the rest of the profiles for subscriber number 2. However, in the first and the second embodiments of the invention it is assumed that the subscriber has one subscriber number for which the different profiles are defined. The appearance and the implementation of the service profile list shown in FIG. 2 may differ from what is shown in the Figure.

Column 3 of FIG. 2 shows features which are given values in columns 4A, 4B, 4C and 4D. The feature list of column 3 is at the same time a service profile basis comprising all the services defined for the subscriber and any terminal settings in the service profiles. The service profile basis can be utilized when service profiles are formed. The feature list shown in FIG. 2 is only an example and meant to illustrate the invention.

The profile identifier in the feature list shown in column 3 of FIG. 2 is a name to be given to the profile or another identifier unambiguously identifying the service profile regarding this subscriber. Two different subscribers using the same profile identifier does not cause confusion. In this example a state of the profile has been included in the feature list. The profile state tells us which profile is currently being used. A mobile station menu feature tells us which of the alternative menus of the mobile station is being used in each profile. This feature is naturally not needed if there are not several menus available. A call forwarding feature is a supplementary service of the GSM network, comprising four different situations in all in which the call forwarding occurs. A call barring feature means a network-specific supplementary service in which calls to certain numbers or to numbers beginning with a certain number series are barred. However, it is possible to call emergency numbers even if all calls are barred. An ordinary short message feature indicates if short messages normally transmitted in the GSM network can be sent from the mobile station and if so, then via which short message centre. E-mail and fax features are here associated with the supplementary services delivered as a short message service. A personal number means a service offered by the intelligent network, in which service the intelligent network reroutes the calls made to the personal number in the way the subscriber has instructed. A 'when will I arrive' short message feature indicates a service in which the time of arrival is automatically inquired in connection with the profile change and the short message is automatically sent to a predetermined number. A ringing tone feature is a feature associated with the mobile station settings, by which the ringing tone to be used in each profile can be chosen.

One of the profiles shown in FIG. 2 is the work_reachable profile which is currently being used. The mobile station menu is menu3. Of the call forwarding features, this service profile does not include forward all. When the phone is engaged or when no answer is received, the calls are transferred to an answering unit1. If the mobile station is not reached, then the calls are transferred to the fixed work phone of the subscriber, whose phone number is ISDN1. Conventional short messages can be sent by the mobile station via the short message service centre SMSC1. The subscriber also has e-mail, fax and a personal number at his/her disposal, the personal number being given a routing instruction1. A conventional ringing tone is chosen as the mobile station ringing tone. Other features are not chosen for the service profile. When the work_engaged service profile shown in FIG. 2 is being used, then the mobile station menu is menu2 which is an extremely simplified menu comprising only the indication of the service profile selected and the option of changing the service profile. All calls made to the mobile station are directly transferred to the secretary to number MSISDN2. Even though the calls are barred, the phone can be used for sending conventional short messages via the short message service centre SMSC1. The ringing tone of the phone is soundless so that the short messages received would not cause disturbance. When the work_engaged service profile is selected, the subscriber is asked about the return time, and on the basis of his/her reply a 'I will return at return time' short message is automatically sent to the secretary to number MSISDN2.

The leisure time and holiday service profiles shown in FIG. 2 differ only slightly from one another. When one of them is used, then the mobile station menu is menu3, which differs somewhat from menu1 and menu2. Both have as an option the forwarding of all calls, by which all calls can be transferred to a desired number, which, however, is not worth programming permanently. In both service profiles the calls are transferred to an answering unit2 when the phone is engaged or to an answering unit3 when no answer is received from the mobile station or when the mobile station cannot be reached. Different answering units can have different kinds of messages. Calls to entertainment lines are barred in both service profiles. Conventional short messages can be sent with the mobile station via the short message service centre SMSC2 in both service profiles. A conventional ringing tone is chosen as the mobile station ringing tone in both. The profiles differ from one another in that a personal number service is used only in the leisure profile on a routing instruction 2, and in that when the holiday profile is chosen, the subscriber is asked about the end of the holiday, and on the basis of the reply, a 'return at end of holiday' short message is automatically sent to number MSISDN2 to the secretary.

The service profiles presented above are only examples and meant to illustrate the invention. For example, information allowing separate billing can be attached to the profiles. Conditions tied to time and/or place can be associated with the profiles, the fulfilled conditions triggering a profile change. The location can be determined on the basis of the cell or the geographical coordinates. Corresponding profiles can be defined for fixed network subscribers too. For example, a fixed network subscriber could have two different profiles, the first one being a work profile and the second one a leisure time profile. The profiles could differ from one another regarding the routing instructions, call forwarding or prefixes of the personal number. The fixed network home user could, in turn, be using time-bound profiles, known as day profiles and night profiles, comprising different call barring and intelligent network services.

FIG. 3 shows the signalling associated with the service profile change according to the first preferred embodiment of the invention, in which it is assumed that the mobile station attends to the updating of the service units in connection with the service profile change. Here a service unit means a unit or a network element comprising subscriber information needed for providing services, for example, information on whether the subscriber is entitled to have services. The service unit is assumed to be a mobile station subscriber's home location register HLR, in which information defined for the subscriber on the GSM network services and their values is maintained. An intelligent network point IN/P is here marked as the service unit associated with the intelligent network services to describe the network elements in which subscriber information of the intelligent network or of other service platforms of the intelligent network type are stored. Correspondingly the subscriber information associated with the short message services or with other service protocols that are not stored in the home location register HLR are stored in the service producer-specific registers, which are here represented by the short message service centre SMSC.

With reference to FIG. 3 the mobile station user wishes to know what service profiles he/she has. Therefore he/she requests the information via a mobile station user interface. The mobile station MS sends a signalling message 3-1 (GetProfiles) inquiring about service profiles to the service profile register SPR in order to obtain the subscriber service profiles. If the user knows which profile information he/she wishes to have or if he/she wishes to have only the profile names, then the parameters indicating the kind of information desired are attached to the signalling message. However, it is assumed in this example that he/she wishes to know all service profiles including their contents.

After reception of the signalling message 3-1 the service profile register searches for the service profiles defined for the mobile station subscriber and sends them to the mobile station MS in a signalling message 3-2 (GetProfilesAck). If the mobile station subscriber is the one whose service profiles are presented in FIG. 2, the signalling message comprises the information presented in columns 4A, 4B, 4C and 4D of FIG. 2.

When the mobile station has received the service profiles, they are shown to the mobile station user via the user interface. When the mobile station user changes profiles in step 3-3 via the user interface, the mobile station registers which profile was selected, analyses the choice and compiles the update messages comprising the setting values of the chosen profile for the service units HLR, IN/P and SMSC. When the update messages are compiled the mobile station MS sends an update message 3-4 (UpdateHLR) to the home location register, an update message 3-5 (UpdateIN) to the corresponding intelligent network points IN/P and an update message 3-6 (UpdateSMSC) to the short message service centres SMSC. Because it was assumed in the example that information on the profile that is being used at a given time is maintained in the service profile registers, the mobile station MS sends an update message 3-7 (Update SPR) to the service profile register SPR. If information on the used profile is not maintained in the service profile register, then the update message 3-7 is not needed.

The mobile station also updates its settings to correspond with the chosen profile in step 3-8. If for example the subscriber of FIG. 2 changes his/her work_engaged service profile to a work_reachable service profile, the mobile station changes its menu and its ringing tone.

The update signallings 3-4, 3-5, 3-6 and 3-7 and step 3-8 described above are not in an absolute chronological order but may occur simultaneously or in any order.

FIG. 4 shows the signalling according to the first preferred embodiment of the invention when the mobile station subscriber forms himself/herself a new service profile via the mobile station user interface. When the subscriber has chosen to form a new profile from the user interface menu, the mobile station MS sends a signalling message 4-1 (GetProfiles(basic)) inquiring about service profiles to the service profile register SPR in order to obtain the subscriber service profile basis. As the mobile station knows on the basis of the subscriber menu choice that a service profile basis is needed, it automatically attaches to the signalling message 4-1 a parameter by which the request is directed to the service profile basis. In other embodiments the service profile basis could also be requested by a separate signalling message.

After reception of the signalling message 4-1 the service profile register searches for the service profile basis defined for the subscriber and sends it to the mobile station MS in a signalling message 4-2.(GetProfilesAck). If the mobile station subscriber is the one whose service profiles are illustrated in FIG. 2, then the signalling message 4-2 comprises the information of column 3 presented in FIG. 2.

When the mobile station has received the service profile basis, it is shown to the mobile station user via the user interface. The user selects the services for the profile and their values in step 4-3 via the user interface and the mobile station registers them. When the profile is ready, the mobile station MS sends the service profile register SPR a new profile to be stored in a subscriber service profile selection by a signalling message 4-4 (SaveProfile). The same signalling can also be used when modifying an already existing service profile. Then the parameter of signalling message 4-1 would indicate the name of the profile to be modified.

Figure 5:
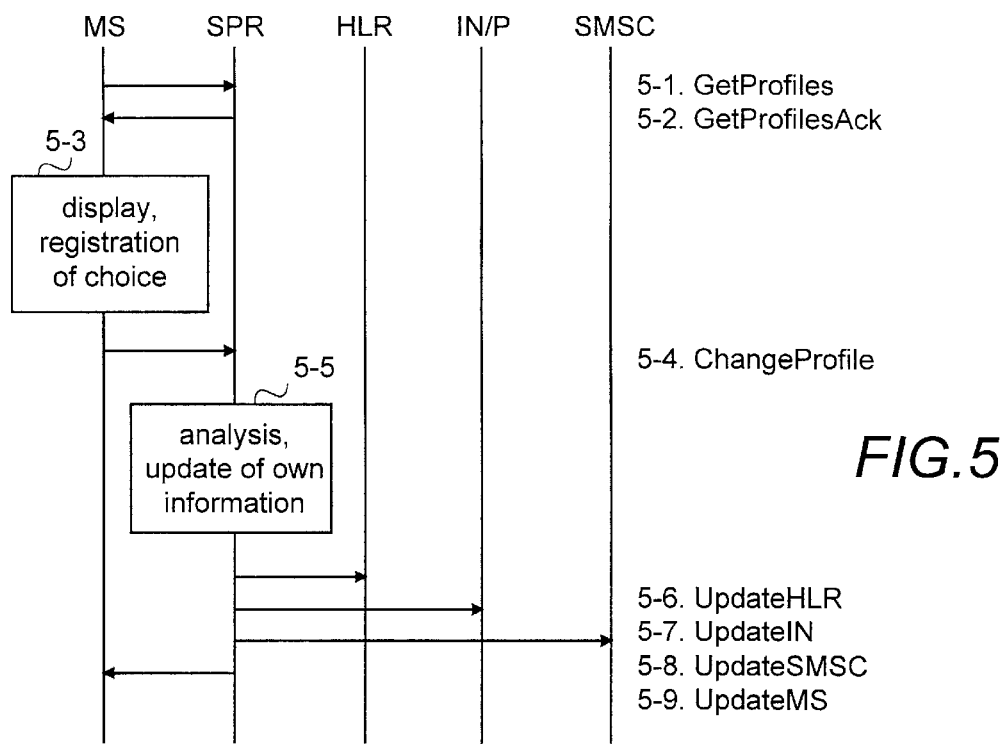
FIG. 5 illustrates signalling according to a second preferred embodiment of the invention in connection with the service profile change.

FIG. 5 shows the signalling associated with the service profile change in the second preferred embodiment of the invention, in which it is assumed that the service profile register ensures the updating of the service units in connection with the service profile change. The service units are the same here as in FIG. 3. With reference to FIG. 5 the mobile station user wishes to know which service profiles he/she has. Therefore he/she requests the information via the mobile station user interface. The mobile station MS sends a signalling message 5-1 (GetProfiles) inquiring about service profiles to the service profile register SPR in order to obtain the subscriber service profiles. If the user knows which profile information he/she wishes to have or if he/she wishes to have only the profile names, then the parameters indicating the kind of information desired are attached to the signalling message. However, it is assumed in this example that he/she wishes to know all the service profiles including their contents.

After reception of the signalling message 5-1 the service profile register searches for the service profiles defined for the mobile station subscriber and sends them to the mobile station MS in a signalling message 5-2 (GetProfilesAck). If the mobile station subscriber is the one whose service profiles are presented in FIG. 2 then the signalling message comprises the information presented in columns 4A, 4B, 4C and 4D of FIG. 2.

When the mobile station has received the service profiles, they are shown to the mobile station user via the user interface. When the mobile station user changes profiles via the user interface in step 5-3, the mobile station sends a message concerning the profile change and the chosen profile to the service profile register SPR in a signalling message 5-4 (ChangeProfile). After reception of the signalling message 5-4 the service profile register SPR analyses the choice, updates any information of its own that the service profile change affects and compiles the update messages comprising the setting values of the chosen profile to the service units HLR, IN/P and SMSC and to the mobile station MS in step 5-5. When the update messages are compiled the service profile centre SPR sends an update message 5-6 (UpdateHLR) to the home register, an update message 5-7 (UpdateIN) to the corresponding intelligent network points IN/P, an update message 5-8 (UpdateSMSC) to the short message service centre SMSC and an update message 5-9 (UpdateMS) to the mobile station MS. If the mobile station is able to update its settings to correspond with the chosen service profile, the service profile centre does not have to send an update message 5-9 to the mobile station.

The update signalling 5-6, 5-7, 5-8 and 5-9 described above are not in an absolute chronological order but may occur simultaneously or in any order and partly simultaneously with step 5-5.

The name of the signalling messages presented above in FIGS. 3, 4 and 5 may differ from what has been presented above without that the information in the messages changes. The messages can also comprise more information than what is mentioned above. Furthermore, all update messages do not have to be sent if the information to be stored in the service unit has not changed. If the terminal does not support different settings and/or the changing of the settings from the network or otherwise automatically, then the update messages are not sent to the terminal.

FIG. 6 is a block diagram showing the mobile station MS according to the first preferred embodiment of the invention. In the GSM system the mobile station MS consists of an actual terminal and of a subscriber identifier module SIM which is detachably connected to the terminal. The SIM card used as a subscriber identifier unit in the GSM system, is a processor card, or a smart card, placed in the terminal and comprising, for example, information needed for identifying the subscriber, such as the International Mobile Subscriber Identity IMSI, and a certain amount of memory M2. The actual terminal comprises a transceiver Tx/Rx with antennas, a user interface UI, a control unit CP and memory M1. The mobile station memory thus comprises two parts, a terminal memory M1 and a SIM card memory M2. The terminal settings are generally stored in memory M1 but can also be stored in memory M2.

The user interface UI generally comprises a keyboard, a display, a loudspeaker and a microphone, which are not presented in FIG. 6. With the user interface UI the subscriber can study one or all service profiles, view the contents of its service profiles, change the service profile used and give further instructions to the control unit CP. In the first preferred embodiment, the subscriber can also form new service profiles or modify already existing service profiles by using the user interface UI.

The control unit CP obtains from the user interface-said inputs associated with the service profiles. The control unit CP can indicate the service profile used for the mobile station MS user via the user interface UI, for example by a message or character appearing on the display. The control unit CP can also give the mobile station user via the user interface sound signals, text instructions or instruction characters associated with the mobile station and/or the function of the mobile communication system in addition to showing service profiles. The control unit receives and sends, for example, signalling messages via the transceiver Tx/Rx. When the user changes his/her service profile in the first preferred embodiment, the control unit CP compiles on the basis of the chosen profile the update messages presented in FIG. 3 and sends them to the corresponding service units. The control unit CP also ensures that the mobile station settings in memories M1 and M2 are updated to correspond with the service profile to which the user has changed. In the other embodiments in which the mobile station attends to the update messages, but in which something else than the user triggers the service profile change, the control unit CP attends to the update messages and makes sure that the mobile station settings are updated as described above and inquires, if needed, about the contents of the service profile before updating. For example, a profile change message arriving from the network can function as a trigger.

In the embodiments in which the mobile station does not attend to the update messages, the control unit CP can be arranged to change the mobile station settings using the transceiver Tx/Rx in accordance with the received update message.

In the first preferred embodiment the mobile station memory comprises the contact information of the service units associated with the subscriber profiles in order to be able to send the update messages to the correct destination. It is possible in the other embodiments to store a location area for a service profile in the memory of the mobile station, preferably in memory M2 of the SIM card. The location area can be based either on cell information or on geographical co-ordinates. Then the mobile station control unit CP is arranged to detect the arrival at the location area and to trigger the service profile change. Similarly a schedule can also be stored in the mobile station memory, preferably in the SIM card memory M2, in which schedule the points of time are determined and for each point of time is defined a service profile which is switched to use at the beginning of the point of time. At this time the mobile station control unit comprises a time counter TC by which the points of time are detected and the control unit CP triggers the profile change. If the mobile station does not attend to the update messages, the control unit CP sends a message indicating the profile change as a result of the profile change to the network unit attending to the update messages.

Figure 7:
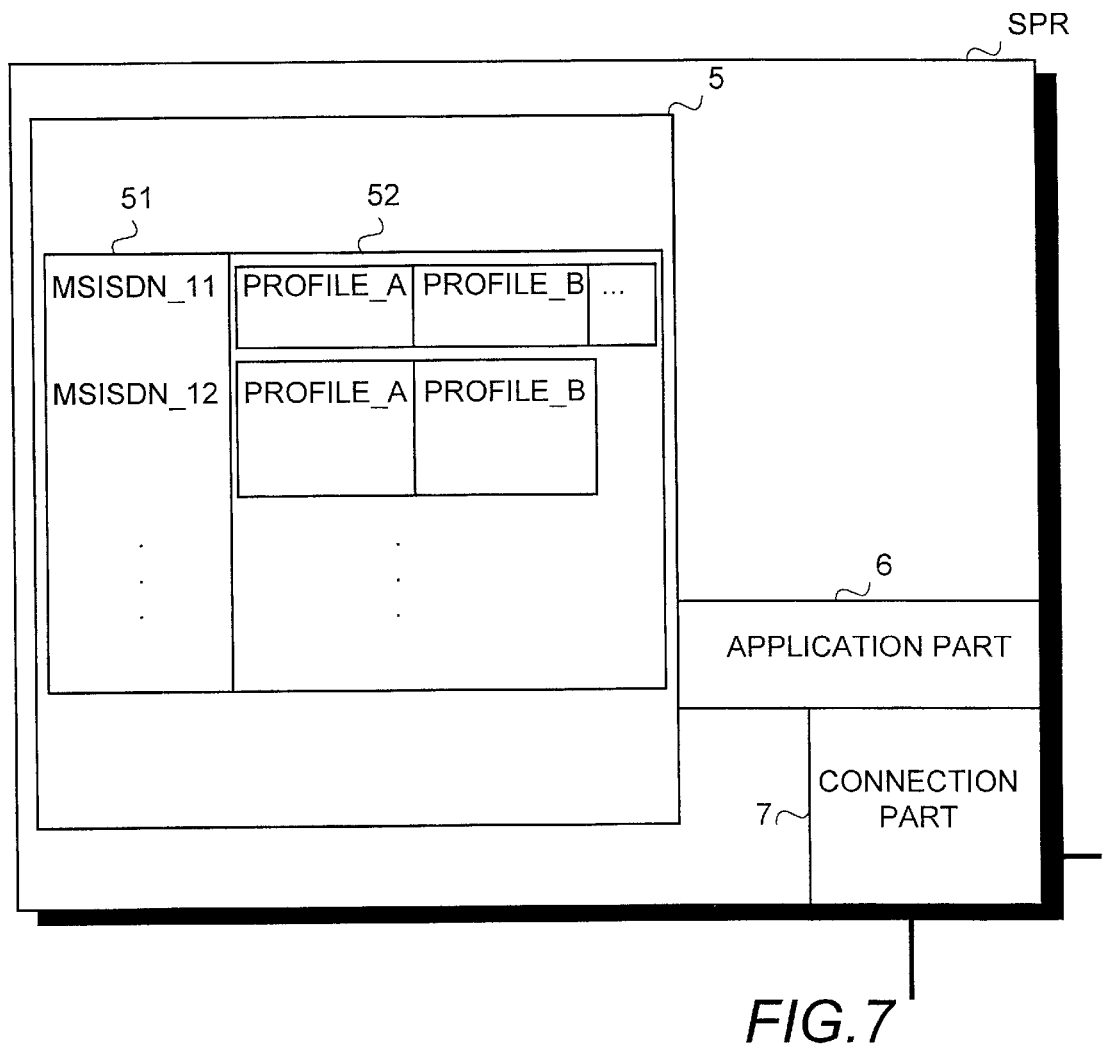
FIG. 7 is a block diagram showing a service profile register according to the second preferred embodiment of the invention.

FIG. 7 is a block diagram showing a service profile register of the invention, which is here called a service profile register SPR. The service profile register SPR comprises a database part 5, an application part 6 and a connection part 7. The database part 5 comprises a service profile list 52 for at least one subscriber 51, an example of which is shown in FIG. 2. In the second preferred embodiment of the invention the database part also comprises the contact information on the service units associated with the subscriber profiles. The database part can also comprise a subscriber-specific schedule in which the points of time are determined and for each point of time is defined a service profile, which is switched to use at the beginning of the point of time.

Using the connection part 7 the service profile register SPR receives and sends messages and information to the network infrastructure (the network subsystem NSS and the base station subsystem BSS shown in FIG. 1) and to the service units outside the network infrastructure (the short message service centre SMSC associated with the short message services and the intelligent network IN shown in FIG. 1) and to the terminals (the MS shown in FIG. 1) and communicates with the maintenance system of the network (not shown in the Figure).

The application part 6 identifies the messages inquiring about the service profiles, is able to direct the message to the correct subscriber and distinguishes the profile identifier or the special request, such as an inquiry of profile names, found in the message. The application part searches for the information indicated by the inquiry message in the database service profile list and compiles a response message, which is forwarded by the connection part 7. The application part 6 also identifies the profile change messages and knows how to update the information of the service profile list in the database 5 in those embodiments in which the information on the service profile that is currently being used by the subscriber is maintained in the service profile register.

In the first preferred embodiment the application part 6 also identifies the new service profile sent via the mobile station and knows how to store it in the service profile list of the subscriber in the database 5. Similarly the application part 6 can update the information of the modified service profile to the database 5. The application part 6 can receive new and updated subscriber-specific service profiles also via the network maintenance system and store them in the correct place in the database 5.

When the user changes his/her service profile in the second preferred embodiment, the application part 6 compiles on the basis of the chosen profile the update messages presented in connection with FIG. 5 and sends them to the corresponding service units. In the other embodiments in which the service profile register attends to the update messages, but the information on the service profile change does not originate from the mobile station but from elsewhere, the application part 6 attends to the update messages and to updating of the service profile list as described above.

If the database part 5 comprises even a single subscriber-specific schedule, the register comprises a time counter (not shown in the Figure) by which the points of time of the service change are detected. Then the application part 6 attends to the change of the service profiles in accordance with the schedule instructions depending on the embodiment either by compiling the update messages or by sending the profile change command to the mobile station.

If the service profile register is integrated into the home register, the database part 5 can comprise a location area for a service profile; when the location area is arrived at, said service profile is changed to the mobile station subscriber. The location area is then preferably based on the cell information, and the location area information is checked for example in connection with a normal mobile station location update. The application part 6 is then arranged to detect the arrival at the location area and to trigger the service profile change. As a result of the triggering and depending on the embodiment the application part 6 either starts to compile the update messages or to send the profile change command to the mobile station.

The above description and the accompanying drawings are only intended to illustrate the present invention. It will be obvious to those skilled in the art that the invention can be varied and modified in many ways, without deviating from the scope and spirit of the invention disclosed in the attached claims.

What is claimed is:

1. A telecommunication system comprising:

subscribers, a subscriber network, terminals for connecting the subscribers with the subscriber network, a set of services containing services provided by the network and supplementary services transmitted by the network, memory means including for at least one network subscriber not less than two different subscriber-specific service profiles including services defined for the subscriber from the set of services, changing means for changing the service profile being used by the subscriber to another service profile, and update means responsive to the changing means for sending the service settings of the service profile to units comprising information needed for providing the services.

2. A telecommunication system as claimed in claim 1, further comprising a time counter for changing the subscriber service profile to a predetermined service profile at a predetermined point of time, wherein the changing means is arranged to be responsive to the time counter.

3. A telecommunication system as claimed in claim 1 wherein the subscriber network is a mobile communication network, the terminal is a mobile station user, and the set of services includes terminal setting.

4. A telecommunication system as claimed in claim 3, wherein the changing means is arranged to change the service profile in response to a terminal location change.

5. A mobile station comprising:

a transceiver for establishing a network connection, the transceiver being arranged to send and receive messages, identification means for identifying a subscriber using the mobile station, message composing means for providing an inquiry message for detecting at least one subscriber-specific service profile of the subscriber, the service profile including services defined for the subscriber and settings which are defined from the network-specific services, the supplementary services transmitted by the network and the settings specific for the mobile station, the inquiry message indicating the subscriber and the service profiles to be detected, reception means for receiving an acknowledgement message including all subscriber service profiles and their contents inquired in the inquiry message, a user interface for displaying each received service profile to the subscriber, changing means for changing a first available service profile used to a second service profile, and setting means responsive to the changing means for changing the values of the mobile station settings in accordance with the second service profile.

6. A mobile station as claimed in claim 5, wherein the message composing means is arranged to detect a service profile basis as the service profile in the inquiry message, the service profile basis including all the services and setting defined for the subscriber, the user interface is arranged to receive instructions from the subscriber, and the mobile station includes composing means for forming a third service profile by selecting from the service profile basis the services and settings of the third service profile in response to the instructions of the subscriber, and by setting to them set values in accordance with the subscriber instructions.

7. A mobile station as claimed in claim 5, wherein the reception means is arranged to receive a change message indicating at least the change of the first service profile to the second service profile, and the changing means is arranged to be responsive to the reception of the change message.

8. A mobile station as claimed in claim 5, wherein the message composing means is arranged to be responsive to the changing means and to provide update messages for the units including the information needed in providing the services.

9. A subscriber register being a part of a telecommunication network and offering the network subscribers a set of services including network-specific services and supplementary services transmitted by the network, the subscriber register comprising:

a subscriber-specific service profile list for at least one network subscriber, the list including not less than two different service profiles, the service profiles containing at least a part of the services that are defined for the subscriber from the set of services, reception means for receiving an inquiry message indicating the subscriber and at least one service profile, message composing means responsive to the reception means for providing an acknowledgement message including all subscriber service profiles and their contents indicated in the inquiry message, and transmission means for sending the acknowledgement message.

10. A subscriber register as claimed in claim 9, wherein the reception means is arranged to receive a profile change message indicating a new profile, the message composing means is arranged to provide update messages for service units including information needed for providing services in response to the reception of a profile change message, and the transmission means is arranged to send the update messages.

11. A subscriber register being a part of a telecommunication network and offering the network subscribers a set of services including network-specific services and supplementary services transmitted by the network, the subscriber register comprising:

a subscriber-specific service profile list for at least one network subscriber, the list including not less than two different service profiles, the service profiles containing at least a part of the services that are defined for the subscriber from the set of services, reception means for receiving a profile change message indicating the subscriber and at least one service profile, message composing means responsive to the reception means for providing update messages for service units including information needed for providing services, and transmission means for sending the update messages.

12. A method for controlling subscriber-specific service profiles in a telecommunication network providing network-specific services and transmitting supplementary services, the method comprising:

defining a set of services for each network subscriber, the set of services including services defined for the subscriber from the network-specific services and supplementary services and subscriber terminal settings if the terminal can change its settings, forming for at least one subscriber not less than two different service profiles both including at least one service from the set of services, storing each formed service profile in a subscriber-specific service profile list, changing a first service profile used by the subscriber to a second service profile and, in response to the service profile change, updating the subscriber-specific values of the units needed in providing services associated with the subscriber service profile to correspond with the second service profile.

\* \* \* \* \*